June 21, 1938.  W. J. CAMERON  2,121,014
VISUAL INDICATOR FOR ASCERTAINING CONDITIONS OF THE CIRCULATORY SYSTEM
Filed May 23, 1936   3 Sheets-Sheet 1
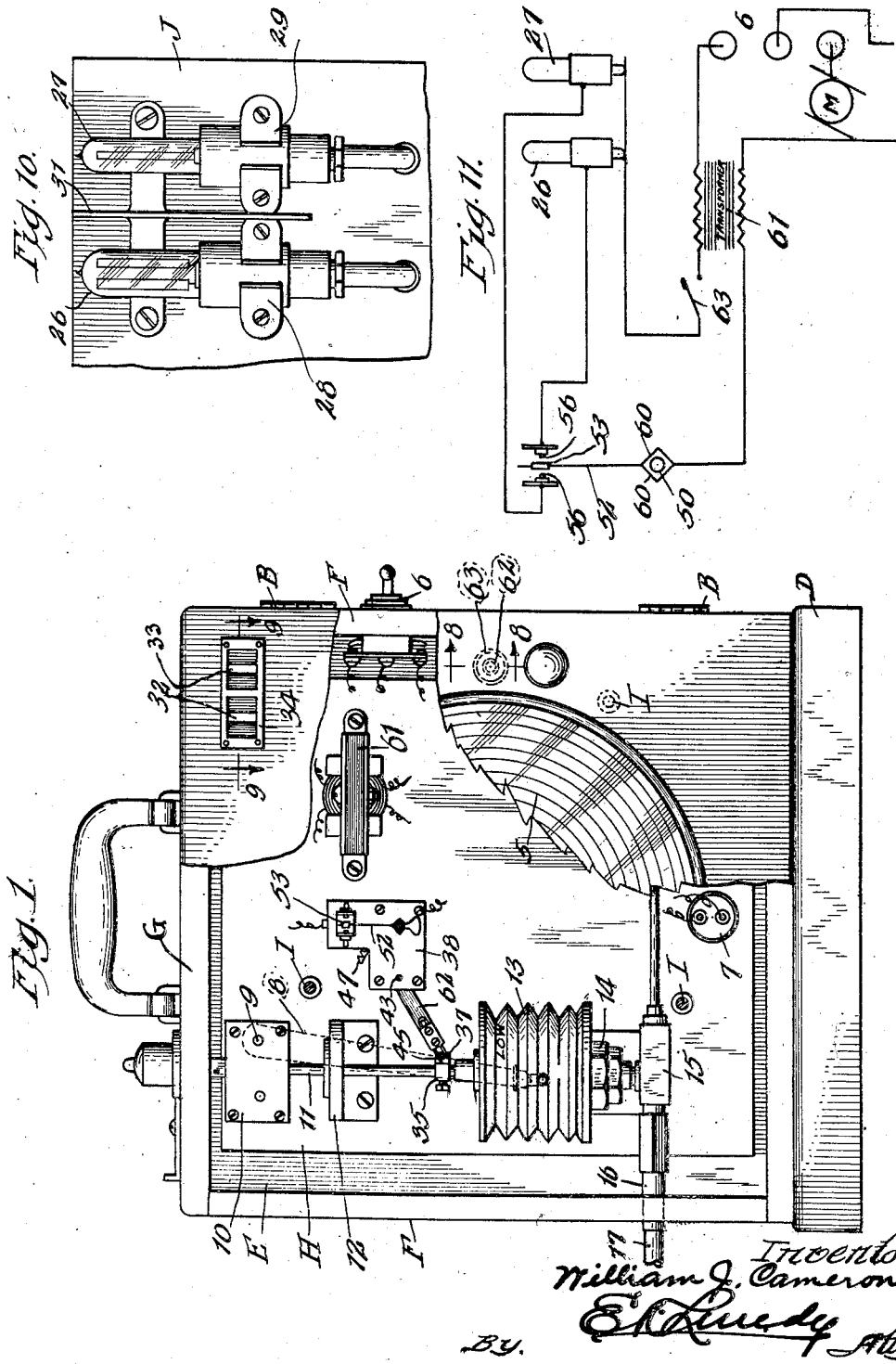

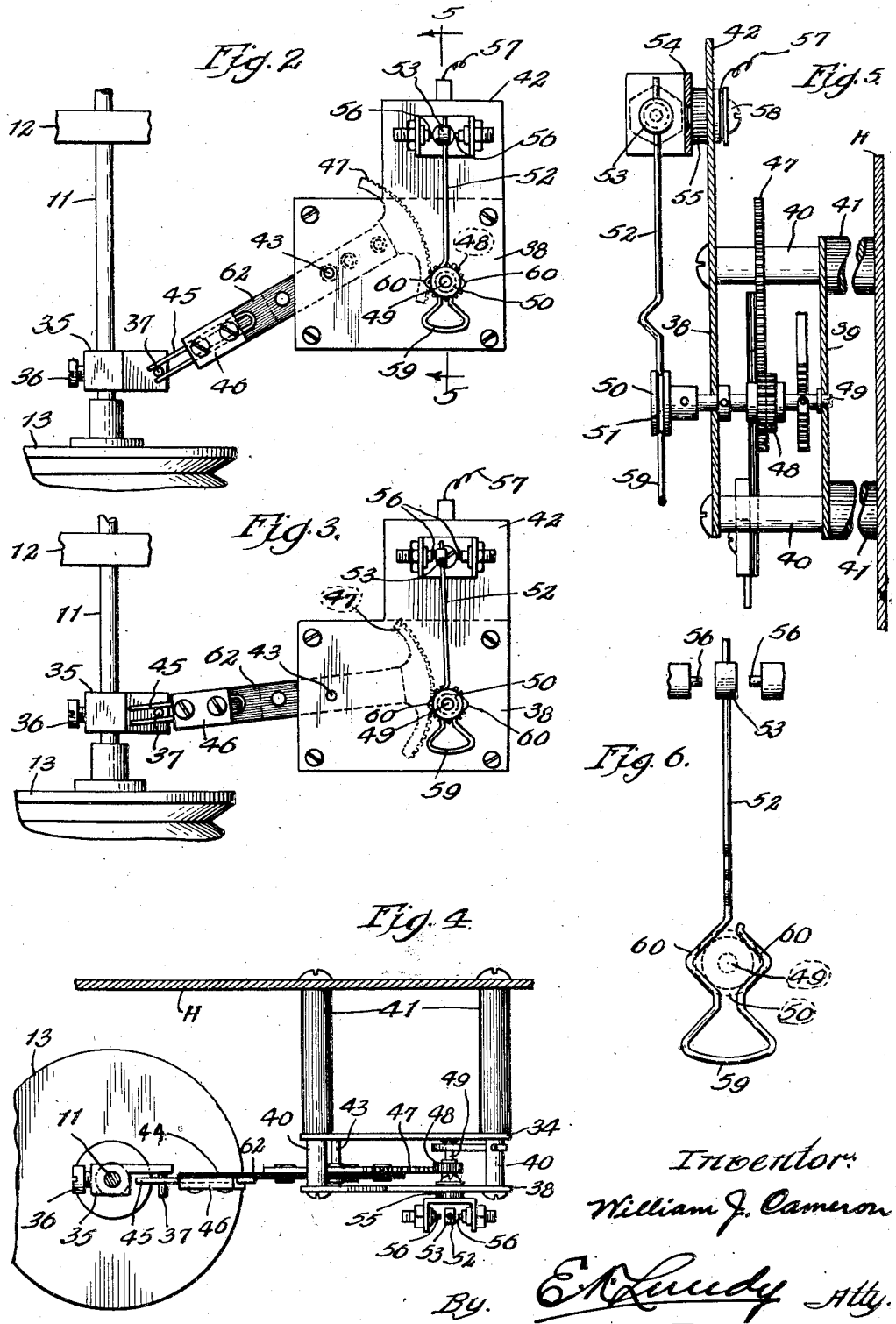

June 21, 1938. W. J. CAMERON 2,121,014
VISUAL INDICATOR FOR ASCERTAINING CONDITIONS OF THE CIRCULATORY SYSTEM
Filed May 23, 1936 3 Sheets-Sheet 3
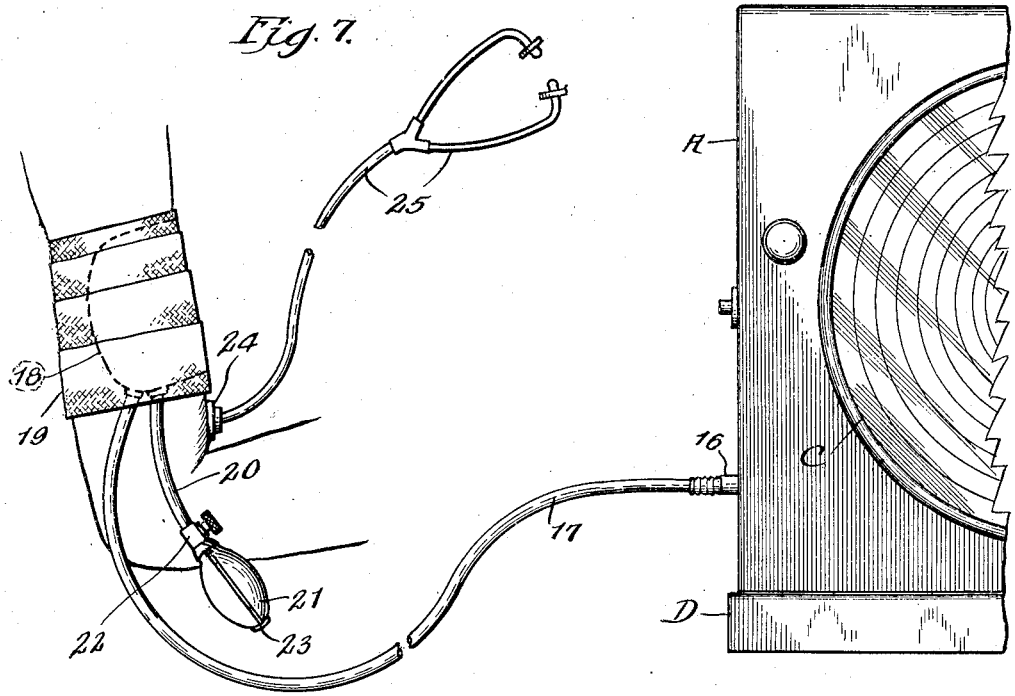
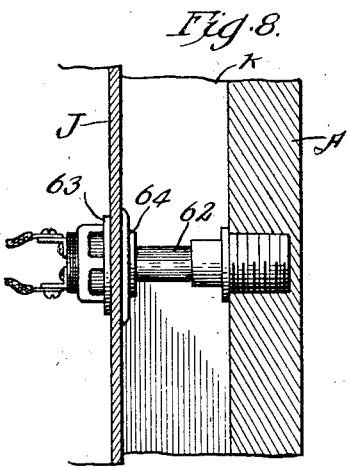
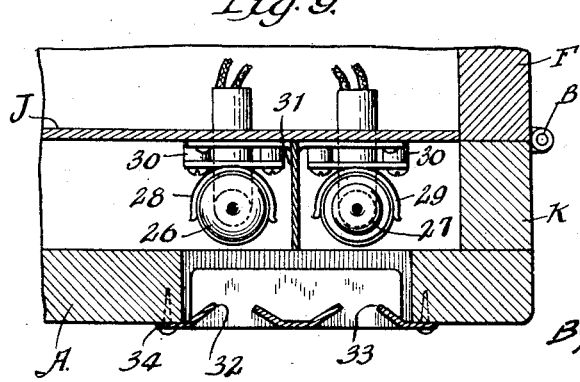
Inventor:
William J. Cameron
By E. K. Lundy
Atty.

Patented June 21, 1938

2,121,014

UNITED STATES PATENT OFFICE 2,121,014

VISUAL INDICATOR FOR ASCERTAINING CONDITIONS OF THE CIRCULATORY SYSTEM

William J. Cameron, Chicago, Ill.

Application May 23, 1936, Serial No. 81,399

15 Claims. (Cl. 128—2.05)

My invention relates to a method of, and an apparatus for, ascertaining pressures of both the pulsating and non-pulsating types, and to indicate such pressures by means of illumination or a lighted object. My improvements relate more specifically to devices for measuring systolic and diastolic blood-pressures and pulse or heart-beats which may be noted in the circulatory system of the human body.

Certain apparatus have been devised for ascertaining and recording the blood-pressures and pulsations, most of which depend to a limited, but definite, extent upon the use of a stethoscope by the person making the examination. In connection with the ascertaining and recording of these pressures and pulsations, I have provided novel means such as a lighted lamp or target for visually indicating to the operator the manner and character of the pressure at all times whether or not the recording mechanism of the apparatus is in operation. This is of material aid to persons operating the apparatus who may be afflicted with deafness, as it will continuously disclose the pulsations to the operator as well as the required critical points of high and low blood-pressures at which points the pulsations of a particular patient usually cease to be audible.

The principal object of my present invention is to provide an apparatus that is readily capable of operating in the manner herein set forth to accomplish the purposes for which it has been designed in an effective and dependable manner. Other objects are to provide an apparatus of this character that is novel in construction; dependable in operation; effective in performing its functions; sturdy in the formation and assemblage of the parts comprised in its make-up; easy to manipulate and operate; simple and sturdy in the formation of the parts so that it will not readily get out of order; and which is economical to manufacture so that it may be sold to the user for a reasonable retail price. Numerous other objects and advantages will be apparent to persons skilled in the art after the construction and operation of my apparatus is understood from the following disclosure.

I prefer to accomplish the numerous objects of my invention and to practice the same in substantially the manner hereinafter fully described and as more particularly pointed out in the appended claims. The accompanying drawings are referred to for better understanding of the construction and operation of my apparatus.

In the drawings:

Figure 1 is a view in vertical elevation of a typical apparatus such as contemplated herein showing my invention installed thereon.

Figure 2 is a detail view in elevation, drawn to a larger scale, of the mechanism for controlling the indicators or lamps.

Figure 3 is a view similar to Figure 2 showing the parts in a different position.

Figure 4 is a top plan of the structure shown in Figure 2.

Figure 5 is an enlarged vertical transverse section taken on line 5—5 of Figure 2.

Figure 6 is a detail of the current make-and-break arm detached.

Figure 7 is a graphic illustration of a manner of using my invention.

Figure 8 is an enlarged vertical section on line 8—8 of Figure 1, showing the main switch for the visual indicator.

Figure 9 is an enlarged horizontal section on line 9—9 of Figure 1 showing details of the visual indicator.

Figure 10 is a detail in front elevation of the indicator lamps.

Figure 11 is a lay-out or plan of the electrical circuit.

The drawings, it will be understood, are more or less schematic in character, and are for the purpose of disclosing a typical or preferred embodiment of my invention, and in these drawings like reference characters identify like parts wherever such parts appear in the different views.

My invention is shown herein as applied to a structure such as disclosed in the application of Thomas Bradford for an "Apparatus and method for ascertaining and recording conditions of the circulatory system", filed August 22, 1936, Serial No. 97,396. It will be understood however that said structure is used merely to typify an apparatus of this character as my improvements are capable of being readily applied to any of the mechanisms used in apparatus for producing cardio-graphs or for ascertaining and recording high or low blood-pressure or the pulse or heart-beats.

The typical mechanism disclosed herein is housed in a suitable portable cabinet or carrying case of substantially rectangular shape, and said case consists of a movable front or door A that is mounted by hinges B upon the hollow body portion, said front or door being provided with a large central opening that is closed by a glass panel C, and a suitable latch retains the door in normally closed position. A base portion D, below the door, provides the support for the hollow body of the case. Said body consists of a vertical rectangular rear-wall E, vertical side-walls F, and a top-wall G, the vertical walls being secured to and resting upon the base D. Secured to the back-wall E is a rectangular-shaped mounting plate H which provides a false back that is disposed in spaced relation to the back wall, and pillars or studs I are secured to and project from the false back for mounting a false front or bed J in desired spaced relation to the false back. The door is formed with rearwardly extending flanges K along its edges that aline with and abut the adjacent edges of the lateral walls of the case when the door is closed. This provides a shallow compartment or recess between the false front J and the door panel for the accommodation of certain portions of the apparatus and also an enclosed chamber between the plates H and J in which the major portion of the apparatus is installed.

The false front J provides a bed or platen for a record card or chart 5 that is circular in outline so that it may be mounted at its center upon and rotates with the second-hand spindle of a suitable clockwork in which the said spindle is moved anti-clockwise and driven electrically through the medium of an ordinary 60-cycle current so that the card or chart moves one complete revolution per minute. A 3-way snap switch 6 controls the current to the clock motor and the electric current is led from any ordinary service outlet by a conductor cord to a connector element 7 in the back wall of the cabinet and which extends through the false back wall H.

Suitable pointers, each actuated pneumatically by a pressure sensitive device within the cabinet, each carry a stylus or pen upon their free ends so that the respective pressures may be recorded upon the chart. One of these pointers 8 is shown in dotted lines in Figure 1 where it will be seen its upper pivoted end is mounted upon a rock spindle 9 that projects through the front plate 10 of a suitable frame work mounted on the upper left hand corner of the false back H. Within this frame there is a plurality of levers mounted upon rocking spindles and co-ordinated with each other so that slight movement of the initial element is multiplied or increased to such an extent that the stylus or pen on the free end of the pointer 8 has a movement that is several times greater than said initial movement. This movement multiplying mechanism is operatively connected to and is actuated by vertical movements of an upright elongated rod 11 that is loosely guided intermediate its ends in the horizontal portion of an L-shaped bracket 12 mounted on the false back H. The lower end of rod 11 is fixed to the head of a pressure sensitive element in the form of a low pressure bellows 13. The opposite or lower head of bellows 13 is securely mounted in a bracket 14 also projecting from the false back H and is provided with a hollow stub that has its bore communicating with the bore of an elongated block 15 through which pressure fluid is supplied. The block 15 is provided with a tubular stub 16 that projects through the adjacent side wall F of the case or cabinet to removably receive the adjacent end of a flexible hose 17 leading from a source of pressure or pressure creating means.

The arm 8 and its stylus indicates and records diastolic pressures and heart-beats or pulse, and the other arm above mentioned is operated by a high-pressure bellows (not shown) at the right in Fig. 1 and communicating with the block 15 to indicate and record systolic pressures and to note the pressure at which the heart-beats are recorded.

The pressure creating means is in the form of a surgical arm band similar to that used by physicians and surgeons in ascertaining blood-pressures of a patient. This is graphically illustrated in Figure 7 and consists of an elastic air bag 18 of rubber or the like that is enclosed in a cloth pocket having an elongated strap or band 19 that is wrapped several turns around the patient's arm above the elbow and is then secured in place by tying or otherwise. The flexible hose 17 establishes communication between the air bag and stub 16 and another flexible hose 20 leads from the air bag to a pressure creating bulb 21 of the hand operated collapsible type which has an adjustable exhaust control valve 22. When it is desired to create pressure within the conduit formed by the hose, stub and block and in the pressure sensitive bellows 13, the attendant places the arm band upon the patient's upper arm adjacent the elbow and proceeds to pump air into the air bag by means of the bulb 21, the control valve 22 being closed. The air is sucked into the bulb through a valve controlled inlet port 23 in its end which admits the air but prevents the air escaping therethrough. By means of the diaphragm element 24 of a stethoscope structure 25 properly placed against the brachial artery just below the arm band, the attendant will listen to the pulsations of the artery until the arm band has been tightened to the critical point where pulsations of the brachial artery are no longer discernible through the medium of the stethoscope. At this critical point the systolic pressure or high blood pressure has been reached and may be recorded upon the chart or card by a suitable pointer or stylus (not shown) by starting the clockwork motor and rotating the chart. By releasing the valve 22 of the bulb and allowing the air bag in the arm band to partially deflate, the attendant by the use of the stethoscope will note the pulsations or actions of the heart until such time as the pressure in the pneumatic system has been lowered to a point where the pulsations can no longer be noted. This is the critical point of diastolic pressure and may be recorded on the chart in the same manner and by the same means above mentioned. Means are provided so that during these readings of the systolic and diastolic pressures the pointer 8 has been lifted away from and is ineffective upon the chart and no recording has been made by it. These means are operated manually, but have not been illustrated, since same do not form part of the instant invention. The next or third step in the use of the apparatus is to record the regularity or irregularity of the pulse beat, the rhythm thereof, and any abnormalities in the cardiac or circulatory systems which may be present in the particular patient. This may be done by increasing the pressure in the air bag about 10 mm. above the diastolic pressure that has been recorded, the exhaust valve 22 having been previously closed.

At this time the pointer 8 is allowed to engage and is effective upon the chart and, since the heart beat causes fluctuations and pulsations of pressure in the closed air system, the bellows will pulsate and will cause a very slight up and down movement of the rod 11. This movement is transmitted from the rod through the mechanism in the frame 10 to the rock spindle 9 and amplified by such mechanism so that a graphic outline of these pulsations is recorded on the chart by the stylus on the movable end of the pointer 8.

As previously herein stated I have provided novel means which visually indicate to the operator the character of the pressure with which the conduit and bellows are charged so that the operator, whether using the stethoscope or not, will know that the pressure is of a pulsating or non-pulsating character. The operator may also instantly ascertain from the same visual source when the critical points of systolic or diastolic pressures have been reached. For this purpose I have provided two lamps 26 and 27, preferably of the neon gas type, that are mounted side-by-side in spring clips 28 and 29 on a mounting plate that is secured to the upper right hand portion of the false front J and separated therefrom by insulating sleeves 30. These lamps are separated from each other by a septum or wall 31 that extends vertically between the false front J and the frame of the door A, which latter is provided with vertical elongated windows 32 and 33 in escutcheon plate 34 horizontally alined with said lamps. Control of these lamps is accomplished through the medium of the structure detailed in Figures 2 to 6, which structure has operative connection with the low pressure bellows 13 that is responsive to and records the pulsating pressure. A suitable collar 35 is adjustably mounted by means of a set screw 36 upon the lower portion of the rod 11 of said low pressure bellows and said collar is provided with an extension that carries a lateral pin or stud 37 projecting horizontally therefrom. To one side and slightly above the bellows there is a frame which consists of vertical plates 38 and 39 that are separated from each other by horizontal corner pillars or spacers 40 that are extensions of horizontal posts 41 projecting from the adjacent portion of the false back wall H. The front plate 38 has an extension 42 projecting above its upper edge. A compositely formed arm is pivoted intermediate its ends upon a rock spindle 43 that is journaled at its ends in the front and back plates 38 and 39 of the frame. The major portion of this arm consists of a strip 44 of insulating material to the outer end of which a fork 45 is secured by means of a screw-held clamp plate 46. This fork 45 is adjustable longitudinally of the arm and its outer portion is engaged with the pin 37 above referred to. The other end of the lever arm has a gear segment 47 secured to it, the teeth of which segment mesh with a small pinion 48 fastened on a rotatable spindle 49 that has bearings in the vertical plates 38 and 39. The forward end of the spindle 49 projects a short distance through and beyond the front plate 38 where a disk 50 is secured to and rotates with it, and the edge of said disk is provided with a shallow friction groove or channel 51. The groove or channel 51 provides a seat or mounting for a rocking contact arm 52 that extends upwardly therefrom to near the top of the extension 42 of the front frame plate where it is provided with a contact embossment 53.

The extension 42 has a U-shaped bracket 54 secured to it and is insulated therefrom by a cylinder 55 of insulating material. The lateral arms of the U-shaped frame carry pin-point contacts 56 that are spaced apart a distance sufficient to allow the embossment 53 to move or vibrate between them and engage one of them at each end of its movement. A conductor 57 leads from a suitable source of current to the binding post that is formed by the screw 58 that anchors the U-shaped bracket upon the plate extension 42 (Fig. 5). The contact arm 52 and contacts 56 provide a suitable make-and-break device that operates upon movement of the bellows 13. The lower portion of this arm 52 is bent in a flattened spring loop 59 and next to this loop the wire forming the arm is bent into opposing right-angular formations 60 as shown in detail in Figure 6. These right-angular formations 60 combine to form a square and are yieldably urged toward each other by the spring loop 59. The sides of the rectangle or square just mentioned are frictionally fitted into the edge groove 51 of the disk 50 and this frictional engagement is sufficient to move the arm 52 a slight distance one way or the other until its embossment 53 engages one or the other of the pin point contacts 56, after which the disk will continue to turn while the rectangle 60 and arm 52 remain stationary until rotation of the disk in the opposite direction takes place. The upward movement of the rod 11 on the low pressure bellows will rotate the disk 50 anti-clockwise and swing the contact forming arm 52 into engagement with the left hand pin point contact as shown in Figure 3. When the bellows 13 has been sufficiently inflated to respond to the pulsating pressure, said pulsating pressure being very light, will cause a vibratory movement of the fork 45, and said vibratory movement is transferred to the contact forming arm 52 and its embossment 53 will rhythmically touch one and then the other of the pin point contacts 56 thereby alternately lighting the neon lamps or bulbs 26 and 27. The operator, so long as he observes an alternate or rhythmic flashing of the lamps is aware of the fact that the pressure in the system is of the pulsating character. When, however, the pressure has been increased or decreased to a point where the use of a stethoscope will fail to note the pulse-beat the contact embossment 53 will remain in engagement with one or the other of the pin point contacts 56 and as a result one lamp or bulb will remain lighted while the other will be extinguished. The operator will then know that a critical point of pressure, either systolic or diastolic has been reached. There is a light hair-spring $x$ of the helical type that acts as a counter-balance and has its ends connected respectively to spindle 49 and a suitable portion of the frame, preferably one of the posts or spacers 40, as shown in Figs. 4 and 5.

The electric current passes through a suitable transformer element 61 before reaching the lamps. This transformer is mounted upon the false back H and is for the purpose of reducing the ordinary 110-v. alternating current to a current of low amperage for the purpose of operating the neon lamps 26 and 27. The door of the cabinet is provided with an adjustable stub 62 that projects inwardly from the rear face of the front wall of the door. An ordinary button switch 63 is suitably mounted in the adjacent portion of the false front J so that its depressible button 64 is in alinement with the adjacent end of the stub 62. By this arrangement the closing of the door will depress the button 64 and form the circuit through the button switch 63, and upon opening the door the button switch will return to its normal position with the circuit opened.

What I claim is:—

1. Apparatus of the kind described comprising a pressure-sensitive device responsive to fluid pressure as distinguished from temperature, means for supplying varying pressures to said device, an indicator, an electric circuit in which said indicator is interposed, a make-and-break device interposed in said circuit, and devices operatively connecting said make-and-break device to said pressure-sensitive device, said devices embodying a vibratory element, a rotary reciprocal element, and means operatively connecting said elements, said means adapting said elements for simultaneous movement together, and also one with relation to the other.

2. Apparatus of the kind described comprising an expandable bellows responsive to fluid pressure as distinguished from temperature, means for supplying varying pressures to said bellows, an indicator, an electric circuit in which said indicator is interposed, a make-and-break device interposed in said circuit, and devices operatively connecting said make-and-break device to said bellows, said devices embodying a vibratory element, a rotary reciprocal element, and means operatively connecting said elements, said means adapting said elements for simultaneous movement together, and also one with relation to the other.

3. Apparatus of the kind described comprising a pressure-sensitive device, means for supplying varying pressures to said device, an indicator, an electric circuit in which said indicator is interposed, a make-and-break device interposed in said circuit, said device including a vibratory arm, a gear-train for moving said arm, and means operatively connecting said gear-train to said pressure-sensitive device, said means embodying a rotary reciprocal element frictionally engaged with and actuating said arm, whereby said arm and said element are adapted for simultaneous movement together, and also one with relation to the other.

4. Apparatus of the kind described comprising a pressure-sensitive device, means for supplying varying pressures to said device, an indicator, an electric circuit in which said indicator is interposed, a make-and-break device interposed in said circuit, said device including a vibratory arm, a rock-spindle, means frictionally connecting said arm to said spindle, and means operatively connecting said spindle to said pressure-sensitive device, whereby said arm and said spindle are adapted to simultaneous movement together, and also one with relation to the other.

5. Apparatus for indicating conditions of the circulatory system of a patient comprising an indicator, an electric circuit in which said indicator is interposed, an inflatable air-bag adapted to be applied to an artery in the circulatory system, a pressure-sensitive element communicating with said air-bag and responsive to various pressures therein, and a circuit interrupter consisting of fixed spaced contacts providing a gap in said circuit, a movable contact adapted to be vibrated between said fixed contacts, and devices operatively connected to and operated by said pressure-sensitive element for actuating said movable contact, said devices embodying an element having back and forth movement and frictionally connected to said movable contact, said devices adapting said movable contact and said element for movement together, and also one with relation to the other.

6. Apparatus for indicating conditions of the circulatory system of a patient comprising an indicator, an electric circuit in which said indicator is interposed, an inflatable air-bag adapted to be applied to an artery in the circulatory system, a pressure-sensitive element communicating with said air-bag and responsive to various pressures therein, and a circuit interrupter consisting of fixed spaced contacts providing a gap in said circuit, a vibratory arm extending between said fixed contacts, a contact on said arm adapted to be engaged with said fixed contacts, and devices operatively connected to and operated by said pressure-sensitive element for vibrating said arm, said devices embodying an element having back and forth movement and frictionally connected to said movable contact, said devices adapting said arm and said element for movement together, and also one with relation to the other.

7. Apparatus for indicating conditions of the circulatory system of a patient comprising an indicator, an electric circuit in which said indicator is interposed, an inflatable air-bag adapted to be applied to an artery in the circulatory system, a pressure-sensitive element communicating with said air-bag and responsive to various pressures therein, and a circuit interrupter consisting of fixed spaced contacts providing a gap in said circuit, a movable contact adapted to be vibrated between said fixed contacts, a gear-train having a member operatively connected to said pressure-sensitive element and actuated thereby, and devices operatively connecting said gear-train to said movable contact, said devices embodying an element having back and forth movement and frictionally connected to said movable contact, said devices adapting said movable contact and said element for movement together, and also one with relation to the other.

8. Apparatus for indicating conditions of the circulatory system of a patient comprising an indicator, an electric circuit in which said indicator is interposed, an inflatable air-bag adapted to be applied to an artery in the circulatory system, a pressure-sensitive element communicating with said air-bag and responsive to various pressures therein, and a circuit interrupter consisting of fixed spaced contacts providing a gap in said circuit, a vibratory arm, a contact on said arm disposed between said fixed contacts and adapted to be alternately engaged therewith, a gear-train having a member operatively connected to said pressure-sensitive element and actuated thereby, and devices operatively connecting said gear-train to said arm, said devices embodying an element having back and forth movement and frictionally connected to said movable contact, said devices adapting said arm and said element for movement together, and also one with relation to the other.

9. Apparatus for indicating conditions of the circulatory system of a patient comprising an indicator lamp, an electric circuit in which said lamp is interposed, an inflatable air-bag adapted to be applied to an artery in the circulatory system, a pressure-sensitive element communicating with said air-bag and responsive to various pressures therein, and a circuit interrupter consisting of fixed spaced contacts providing a gap in said circuit, a vibratory arm, a contact on said arm disposed between said fixed contacts and adapted to be alternately engaged therewith, a gear-train having a member operatively connected to said pressure-sensitive element and actuated thereby, an edge-grooved disk carried by the spindle of one of the gears in said train, and means for frictionally engaging said arm in the groove of said disk.

10. Apparatus of the kind described comprising an expansible device sensitive to varying fluid pressures, an indicator, an electric circuit in which said indicator is interposed, an interrupter in said circuit for controlling said indicator, said interrupter embodying a vibratory member, a rotary reciprocal member operatively connected with and actuated by said expansible device, and means operatively connecting said members, said means adapting said members for movement together, and also one member relative to the other.

11. Apparatus of the kind described comprising an expansible device sensitive to varying fluid pressures, an indicator, an electric circuit in which said indicator is interposed, an interrupter in said circuit embodying a vibratory member, a forwardly and backwardly movable member having operative connection with said expansible device, and means frictionally connecting said members together for simultaneous back and forth movement, whereby one of said members is arrested in its movement in the same direction with the other member while the movement of the said other member continues.

12. Apparatus of the kind described comprising an expansible device sensitive to varying fluid pressures, an indicator, an electric circuit in which said indicator is interposed, an interrupter in said circuit and controlling said indicator, said interrupter embodying a vibratory member adapted to make and break the circuit, a rotatable member on which said vibratory member is frictionally mounted and having operative connection with said expansible device, and means for causing said frictional connection between said members, whereby said members are adapted for movement together, and also one member independently of the other member.

13. Apparatus of the kind described comprising an expansible bellows sensitive to varying fluid pressures as distinguished from temperature, an indicator, an electric circuit in which said indicator is interposed, an interrupter in said circuit for controlling said indicator, said interrupter embodying a vibratory member, a rotary reciprocal member operatively connected with and actuated by said bellows, and means operatively connecting said members, said means adapting said members for movement together and also one member with respect to the other member.

14. Apparatus of the kind described comprising an expansible bellows sensitive to varying fluid pressures and means for supplying pressure fluid thereto, an indicator, an electric circuit in which said indicator is interposed, a make-and-break device in said circuit, and means responsive to the operation of said bellows for actuating said make-and-break device, which said means embodies a vibratory element, a rotary reciprocatory element, and means operatively connecting said elements to and adapting them for simultaneous movement together and also one with relation to the other.

15. Apparatus of the kind described comprising an expansible bellows sensitive to varying fluid pressures and means for supplying pressure fluid thereto, an indicator, an electric circuit in which said indicator is interposed, a make-and-break device interposed in said circuit and embodying a vibratory switch arm, a rock-spindle, means frictionally connecting said arm to said spindle, and means responsive to the operation of said bellows for actuating said spindle, whereby said arm and said spindle are adapted for simultaneous movement together and also one with relation to the other.

WILLIAM J. CAMERON.